United States Patent [19]

Butman, Jr. et al.

[11] 4,385,252

[45] May 24, 1983

[54] SUPPORT FOR EXCITER WINDING BAR

[75] Inventors: Thomas R. Butman, Jr., Albany; Frank E. Anderson, Jr., Scotia; James M. Anderson, Cohoes, all of N.Y.

[73] Assignee: General Electric Company, Schenectady, N.Y.

[21] Appl. No.: 302,962

[22] Filed: Sep. 17, 1981

[51] Int. Cl.³ .............................................. H02K 3/48
[52] U.S. Cl. .................................... 310/214; 310/215; 428/290
[58] Field of Search ............... 310/192, 193, 194, 214, 310/215, 217, 270; 428/290

[56] References Cited

U.S. PATENT DOCUMENTS 3,909,931 10/1975 Lambrecth .......................... 310/214
4,200,818 4/1980 Ruffing et al. ...................... 310/214
4,318,020 3/1982 Meyer ................................. 310/194

Primary Examiner—William R. Dixon, Jr.
Attorney, Agent, or Firm—John F. Ahern

[57] ABSTRACT

An improved support system for "P" bars is disclosed, wherein the "P" bar is mounted in a stator slot of the stator core of a dynamoelectric machine which has an integral excitation system. The support system includes a number of elements, all of which, in combination, serve to secure the "P" bars in the slots of the stator core and, additionally, provide a low friction interface between the "P" bar and the support system such that the "P" bar is independently suspended and is actually capable of slight movement along its longitudinal axis.

12 Claims, 6 Drawing Figures

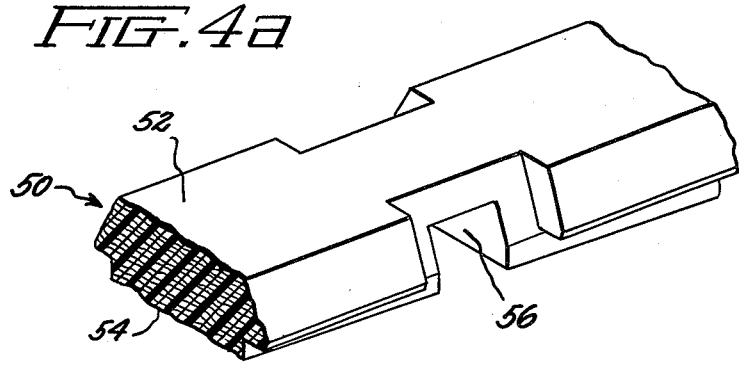
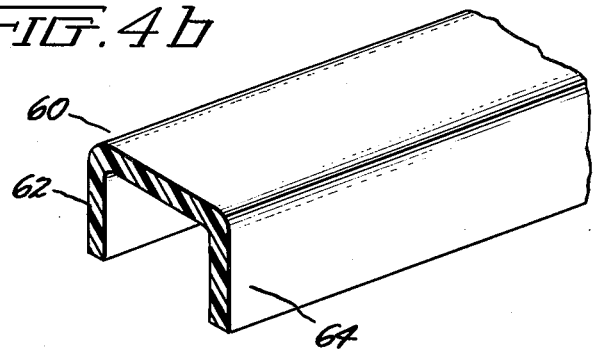
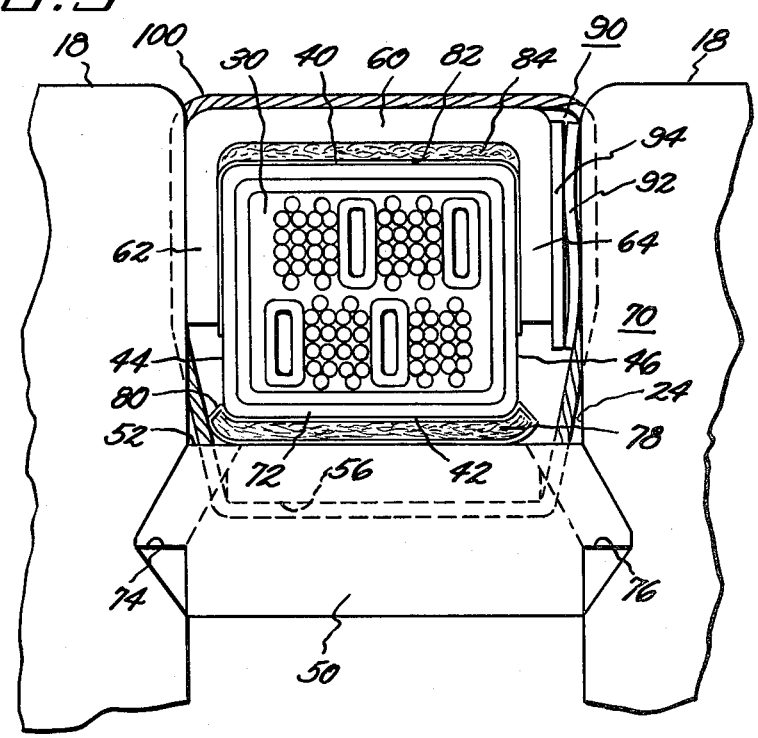

SUPPORT FOR EXCITER WINDING BAR

BACKGROUND OF THE INVENTION

1. Field of the Invention

This invention relates to securing stator windings and more particularly to supporting exciter winding bars in the slots of the stator core of a dynamoelectric generator incorporating an excitation potential source that is integral within the generator.

2. Description of the Prior Art

Y. S. Haggett, in "Large Steam Turbine-Driven Generators", published by General Electric Company, Schenectady, N.Y., December, 1978, provides a comprehensive description of dynamoelectric machines used in the production of electrical power. For proper operation of the turbine-generator, certain auxiliary equipment is required, and one of the major items is an excitation system which functions to provide magnetizing power to the rotating generator field winding.

The reference points out that the basic requirements of the excitation system are to furnish direct current to the field winding at a relatively low voltage (300-500 volts) compared to the generator stator voltage. One source of power which has proved to be practical in providing a high reliability excitation sytem is a commutator-type dc generator, usually driven from the generator shaft by mechanical drive. A second source is an ac alternator and rectifier combination which includes an ac alternator mechanically driven from the generator shaft, the output from which is low-voltage ac fed through rectifiers to provide dc to the generator field. Another type employs a transformer source of ac power used in conjuction with rectifiers to provide dc, wherein the source may be from the main generator leads through a special transformer.

New designs for static excitation systems have been developed to displace the time-proven shaft-driven rotating exciters. The GENERREX excitation system is a static excitation system, and an innovative design developed by General Electric Company, is integral within the generator itself, and is described by G. W. Cotzas et al, "Description and Tests of the GENERREX Excitation System for Large Steam-Turbine Generators", IEEE Trans., Vol. PAS-95, No. 3, May/June 1976, pp. 803-810. The GENERREX-CPS (Compound Power Source) excitation system utilizes both generator voltage and current, and was developed to meet the demand for both high initial response and high response ratio performance characteristics. Thus, excitation system response ratios of 3.5 have been supplied.

Historically, the majority of excitation systems have been supplied with a response ratio of about 0.5 per unit. Although a definite trend is observed in recent years toward higher performance levels, significant interest remains for the base level of 0.5 response. The GENERREX-PPS (Potential Power Source) excitation system, incorporating a potential power source integral to the generator, has been developed to meet this demand. It has been described in a paper by G. M. Cotzas et al, "GENERREX-PPS (Potential Power Source) Excitation System for Wisconsin Power & Light, Edgewater 5", presented at the Forty-Third Annual American Power Conference, Chicago, Ill., Apr. 27-29, 1981. The concept of the GENERREX-PPS excitation system retains many desirable features of the GENERREX-CPS system. Accordingly, compact arrangement of equipment is provided for reduced space requirements and simplified maintainability of the generator. Control of generator field voltage is by means of direct high-speed thyristor action. The excitation potential source consists of a winding made up of three excitation potential conductors or potential bars (each hereinafter referred to as a "P" bar) heretofore mounted on the stator in the stator-rotor air gap.

In the GENERREX-PPS system the slot support for the "P" bar is also desirable to provide uninterrupted and unyielding radial and transverse support, along the entire length of the stator core for the life of the dynamoelectric generator, against running forces which act continuously at twice the power frequency; and against sudden short-circuit forces which would occur rarely, if at all, but which are much more severe than the normal running forces. In addition, the insulated "P" bar must be allowed to move axially with respect to the support system as its temperature and that of its surroundings vary. The support must be designed so that continuous operation and repeated thermal cycling will not result in failure of the supporting structures or the insulation which isolates the "P" bar from the electrical ground.

It is, therefore, an object of the present invention to provide a new, improved support system for securing the "P" bars of the excitation system of a dynamoelectric machine in the slots of the stator core in such a manner as to be able to withstand the normal operating conditions of the dynamoelectric machine and those transient conditions which might occur as a result of misoperation.

SUMMARY OF THE INVENTION

In accordance with the present invention, we have discovered an improved support system for a "P" bar, wherein the "P" bar is mounted in a stator slot of the stator core of a dynamoelectric generator which has an integral excitation system. The support system includes a number of elements, all of which, in combination, serve to secure the "P" bars in the slots of the stator core and, additionally, provide a low friction interface between the "P" bar and the support system such that the "P" bar is independently suspended and is actually capable of slight movement along its longitudinal axis. The first group of elements includes a stator wedge having a top and a bottom surface, a first layer of conformable material disposed on the top surface of the wedge and a first low friction film disposed on the first conformable layer. Then the "P" bar, having a low friction, inert, heat stable coating on its top and bottom surfaces and its opposed side surfaces, is disposed on the first low friction film and so oriented that the bottom surface thereof is in contact with the first film. A second low friction film is disposed on the top surface of the "P" bar and is in contact with the side surfaces of the "P" bar and a second layer of conformable material is disposed on this film.

Subsequently, a rigid, U-shaped longitudinal covering member is disposed on the second layer of conformable material and, it is so oriented that the sides of the member extend downwardly along the sides of the "P" bar to provide side bearing surfaces. Between at least one side bearing surface of the covering member and the stator slot, there is placed a non-electrically conductive, non-magnetic, lateral restraining means which includes at least a compressible spring member. Finally, a means for securely fastening the "P" bar in the stator slots is applied to all the elements.

DESCRIPTION OF THE DRAWINGS

Our invention is more clearly understood from the following description taken in conjunction with the accompanying drawing in which:

FIGS. 4a and 4b are fragmentary three-dimensional views of some of the elements included in the support system;

FIG. 5 shows a fragmentary cross-sectional view of a "P" bar and the "P" bar support system of a preferred embodiment of the present invention.

Referring now to FIG. 1, the simple schematic shows a conventional dynamoelectric generator 10 encased in a generator frame 12. As is well known in this art, the two major parts of the generator are the rotor or the field and the stator or armature. The field when electrically excited is a source of magnetic lines of flux. The armature is an assembly of closed loop conductors within which voltage is induced by the rotating field and is shown as stator 16 which includes the stator core 18 and the stator windings 20. The configuration of the stator core 18 is further illustrated in FIG. 2, which shows a stack of stator core laminations 22. These are designed with radial slots 24 for the stator winding which is typically formed from a multiplicity of stator winding bars. We have briefly referred to FIGS. 1 and 2 for the purpose of giving general background information and for illustrating the location of the "P" bar and the support system in the discussion that follows.

In FIG. 3 a representative "P" bar 30 is illustrated as having essentially a rectangular cross section and extending over the length of the stator core. The "P" bar 30 contains insulated copper windings 32 embedded in a thermosetting epoxy resin 34 which is covered by a ground insulation 36. The "P" bar 30 is prevented from overheating by water cooling through water channels 38. "P" bar 30 has a top surface 40, and an opposed bottom surface 42, and has two opposed side surfaces 44 and 46. The dimensions of top, bottom and side surfaces 40, 42, 44 and 46, respectively, typically are about 1 to 1.25 inch. However, "P" bar 30 itself extends the full length of the stator core and may extend as far as 25 feet and even longer in some cases. The thermal expansion property of "P" bar 30 is very similar to that of copper. When "P" bar 30 heats up during normal operation of the generator 10 or during transient short circuits, the most significant thermal displacements occur in the longitudinal direction.

Figure 1:
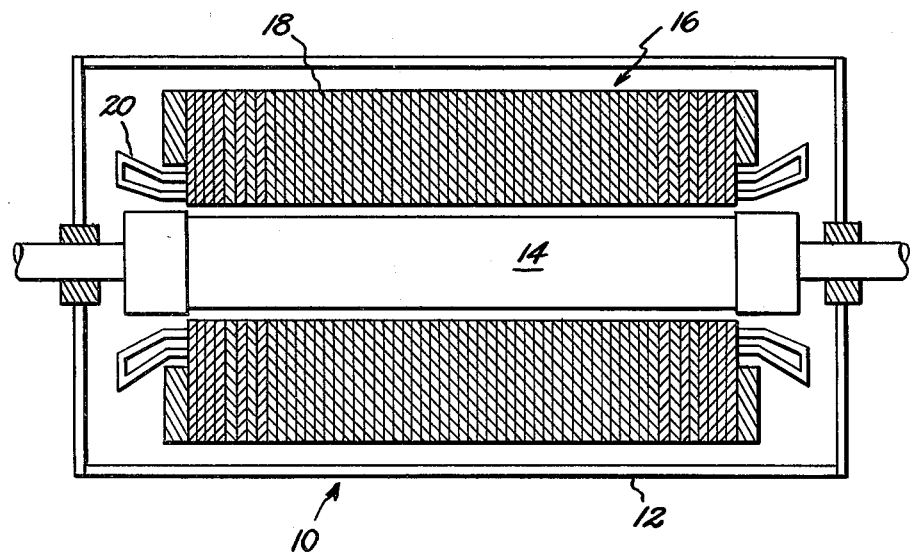
FIG. 1 illustrates schematically a generator of the dynamoelectric type having a frame and stator with windings thereon, and a rotor.
Figure 2:
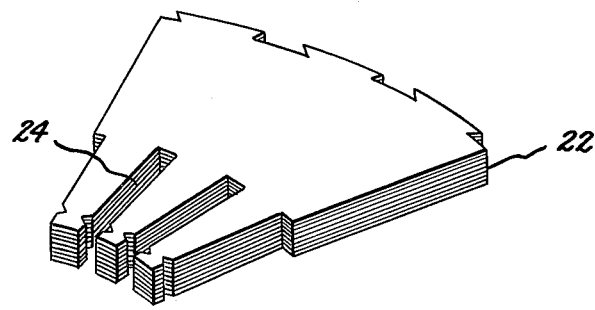
FIG. 2 illustrates a group of steel laminations in the stator core.
Figure 3:
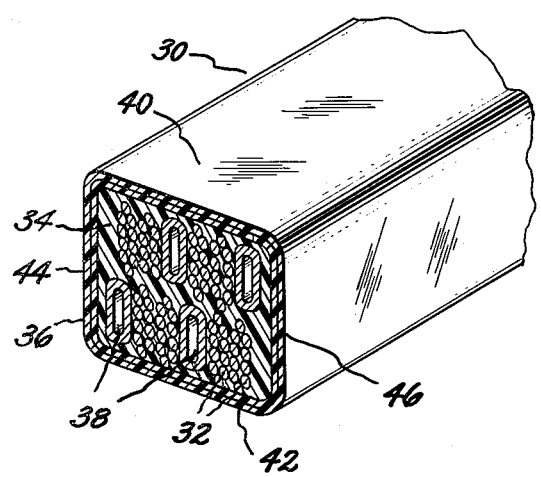
FIG. 3 is a fragmentary three-dimensional view of the "P" bar.

The support system 70 for "P" bar 30 includes a number of elements, fragmentary portions of two of which are shown in FIGS. 4a and 4b. The stator slot wedge 50 as illustrated in FIG. 4a is typically several inches in length, and a plurality of these are installed in abutting relationship to each other such that they extend the full length of stator core 18. The wedge 50 has a flat top surface 52 and a flat bottom surface 54. Extending laterally from bottom surface 54 in a perpendicular direction to the longitudinal dimension of wedge 50 are a plurality of spaced open channels 56. The wedge 50 may be formed from a fabric reinforced phenolic resin which has been laminated and is commercially available from General Electric under the trademark of Textolite.

The longitudinal covering member 60, as shown in FIG. 4b, is shaped like an inverted U and has a top portion and two opposed sides 62 and 64. When in place it covers "P" bar 30, and sides 62 and 64 of member 60 extend more than halfway down sides of 44 and 46 of "P" bar 30. The covering member 60 is made from a molded glass reinforced thermoset resin, such as a polyester resin.

The preferred embodiment of the invention is illustrated in FIG. 5, which shows "P" bar 30 supported in radial stator slot 24. The support system 70 actually has two functions. Firstly, it serves to secure and affix the "P" bar 30 in the upper portion of the stator core slot 24. Secondly, support system 70 provides low friction interface 72 between "P" bar 30 support system 70, such that a limited but independent axial movement of "P" bar 30 is permitted to occur relative to support system 70, whereby mechanical stresses arising in the components due to friction between them during normal operation of the generator 10 are minimized, and failure of the support system 70 or "P" bar insulation 36 which might otherwise occur is avoided. As shown, wedge 50 is disposed in stator core slots 24 above stator windings (not shown) and fitted into the lateral grooves 74 and 76 to firmly fix the position of wedge 50 in slot 24.

First layer 78 of conformable material is disposed on top surface 52 of wedge 50. The preferred material is padding of a resin impregnated, substantially resilient material, such as a polyester felt, which is placed in the desired location. The felt, impregnated with a thermosetting resin, is initially soft and shapable and then, after curing in situ, becomes hard and strong in compression. On top of and encasing first layer 78 is first low friction thin film 80 of very smooth or glassy, relatively high-temperature, stable, inert material, many of which are well known in the art.

Initially, "P" bar 30 is treated with a low friction, inert, heat stable coating (not shown) on all its surfaces. The material used in forming the coating must be relatively heat stable and it must be substantially inert. Therefore, no substance can be used which will corrode or attack any surface with which it makes contact. A suitable release or low friction material is a fluorocarbon resin, which may be applied by brushing or spraying. The "P" bar 30, to which the coating has been applied, is then disposed on first low friction film 80 and so oriented that bottom surface 42 is in contact with film 80.

Second low friction film 82 is disposed on top surface 40 of "P" bar 30 and covering sides 44 and 46. The combined action of both film 80 and 82, together with the low friction coating, is to provide a low friction interface 72 between "P" bar 30 and support system 70. Alternatively, films 80 and 82 can be combined into a single sleeve surrounding "P" bar 30. The second film 82 is made from the same material and has the same thickness as first film 80. Second layer 84 of conformable material is disposed on film 82. The description of first layer 78 applies equally well to second layer 84.

Covering member 60, as illustrated in FIG. 4b, and discussed hereinabove, is rigid and has a U-shaped cross section. Covering member 60 is disposed on second layer 84 and so oriented that the sides 62 and 64 extend downwardly along the respective sides 44 and 46 of "P" bar 30. Typically sides 62 and 64 extend more than halfway down the sides 44 and 46, such that a substantial portion of "P" bar 30 is enclosed thereby. Additionally, the sides 62 and 64 provide side bearing surfaces which are braced with lateral restraining means 90 against the side of the stator slot. Between at least one side bearing surface of covering member 60 and stator slot 24, there is placed a non-electrically conductive, non-magnetic, lateral restraining means 90 which includes at least a compressible spring member 92, such as a ripple spring, and optionally a lateral filler 94. Spring member 92 and lateral filler 94 may both be disposed on one side or each may be disposed on different sides of covering member 60. The exact position of these two elements 92 and 94 is not critical and is a matter of choice.

Employing conventionally well-known techniques, all the elements are then secured in place by means of radial ties 100, which are made from glass roving that has been preimpregnated with a polyester resin. This prepregged roving is wrapped around and secures the support system 70 to the slot wedge 50 through channels 56.

After all the elements have been firmly secured, the entire dynamoelectric machine is placed in an oven at a sufficient temperature and for a sufficient time to cure all the thermosetting resins.

A similar tie and cap support arrangement with conforming pads has been used in the GENERREX-CPS excitation system discussed hereinabove. However, this structure is distinguished from the present invention in a number of ways. Firstly, it provides no transverse support for the "P" bar in that none of the elements are in contact with the sides of the "P" bar and the sides of the stator slot, since the "P" bar is in the air gap. Secondly, the cap is used mainly as a platform for the ties and radially directed hydraulic loading during the tying operation, but the cap does not have sides extending downwardly along the sides of the "P" bar to provide side bearing surfaces. Thirdly, there is no low friction interface between the "P" bar and the support to permit axial movement of the "P" bar.

It will be appreciated that the invention is not limited to the specific details shown in the illustrations and that various modifications may be made within the ordinary skill in the art without departing from the spirit and scope of the invention.

What is claimed is:

1. In combination, a "P" bar and a support system therefor, wherein the "P" bar is mounted in a stator slot of the stator core of a dynamoelectric machine having an integral excitation system, the combination comprising:
    a stator slot wedge having opposed top and bottom surfaces;
    a first layer of a conformable material disposed on the top surface of said wedge;
    a first low friction film disposed on said first conformable layer;
    an elongated "P" bar having opposed top and bottom surfaces, opposed side surfaces and a low friction, inert, heat stable coating on all of said surfaces, said "P" bar being disposed on said first low friction film and so oriented that the bottom surface thereof is in contact with said first film;
    a second low friction film disposed on the top surface of said "P" bar and in contact with the side surfaces thereof;
    a second layer of conformable material disposed on the second low friction film;
    a rigid, U-shaped, longitudinal covering member disposed on the second layer of conformable material and so oriented that the sides of the member extend downwardly along the respective sides of the "P" bar to provide side bearing surfaces therefor and said member encloses a substantial portion of the "P" bar;
    a non-electrically conductive, non-magnetic, lateral restraining means including at least a compressible spring member disposed between at least one side bearing surface of the covering member and the stator slot; and
    means for securely fastening said "P" bar in said stator slot of the stator core.

2. The combination of claim 1, wherein said conformable material is a polyester felt impregnated with an epoxy resin.

3. The combination of claim 2, wherein the securing means are radial ties which in the precured state consist essentially of glass roving impregnated with a polyester resin.

4. The combination of claim 3, wherein the resins have been cured in situ.

5. The combination of claim 1, wherein said first low friction film is connected to said second low friction film to form a sleeve surrounding the top, bottom, and side surfaces of the "P" bar.

6. The combination of claim 1, wherein said first low friction film encloses said first layer of conformable material.

7. The combination of claim 1, wherein said lateral restraining means comprises a compressible spring member and a lateral filler, said spring member and said lateral filler being only one side bearing surface of said covering means.

8. The combination of claim 7, wherein said spring member is a ripple spring.

9. The combination of claim 1, wherein said lateral restraining means comprises a compressible spring member and a lateral filler, said spring member being on one side bearing surface of said covering means and said lateral filler being on the other side bearing surface of said covering means.

10. The combination of claim 9, wherein said spring member is a ripple spring.

11. The combination of claim 3, wherein said support system includes a plurality of wedges which are elongated in the same direction as said elongated "P" bar, said wedges having a plurality of open channels extending from their bottom surfaces in a perpendicular direction to the longitudinal dimension of said wedges, and said radial ties being secured through said channels.

12. In a dynamoelectric machine having a static excitation system wherein potential bars are disposed along the length of the armature thereof to supply electric potential to said excitation system, the improvement comprising:
    (a) at least three slots in said armature deep enough to accept armature bars and said potential bars;
    (b) a retaining wedge inserted in said armature slot retaining armature bars therein;
    (c) potential bars disposed in said slots over said wedges;
    (d) means within said slots to firmly position and hold said potential bars against radial or circumferential motion within said slots; and
    (e) antifriction means interposed between said potential bars and said last-named means to provide for axial motion of said potential bars to accommodate for elongation thereof due to thermal expansion.

* * * * *